United States Patent
Porter

(10) Patent No.: US 11,630,428 B2
(45) Date of Patent: Apr. 18, 2023

(54) REAL-TIME ANALYSIS OF VIBRATION SAMPLES FOR OPERATING ENVIRONMENT CLASSIFICATION AND ANOMALY DETECTION

(71) Applicant: Trimble Inc., Sunnyvale, CA (US)

(72) Inventor: Miles R. Porter, Minneapolis, MN (US)

(73) Assignee: Trimble Inc., Sunnyvale, CA (US)

( * ) Notice: Subject to any disclaimer, the term of this patent is extended or adjusted under 35 U.S.C. 154(b) by 0 days.

(21) Appl. No.: 17/396,328

(22) Filed: Aug. 6, 2021

(65) Prior Publication Data
US 2023/0040578 A1 Feb. 9, 2023

(51) Int. Cl.
G05B 15/02 (2006.01)
G06N 20/10 (2019.01)

(52) U.S. Cl.
CPC ............ G05B 15/02 (2013.01); G06N 20/10 (2019.01)

(58) Field of Classification Search
CPC .................................. G05B 15/02; G06N 20/10
See application file for complete search history.

(56) References Cited

U.S. PATENT DOCUMENTS

| | | | | |
|---|---|---|---|---|
| 6,241,156 B1 * | 6/2001 | Kline | ............... | F24F 11/62 700/277 |
| 11,067,976 B2 * | 7/2021 | Cella | ............... | H04L 1/0002 |
| 11,209,813 B2 * | 12/2021 | Cella | ............... | G06V 10/776 |
| 11,341,374 B2 * | 5/2022 | Batoukov | ............... | G06N 20/00 |
| 2011/0312622 A1 * | 12/2011 | Azimi | ............... | F16K 99/003 506/39 |
| 2011/0312841 A1 * | 12/2011 | Silverbrook | ............... | C12Q 1/68 506/40 |
| 2012/0041575 A1 * | 2/2012 | Maeda | ............... | G05B 23/024 700/79 |
| 2018/0107169 A1 * | 4/2018 | Hu | ............... | G05B 17/02 |

(Continued)

OTHER PUBLICATIONS

Extended European Search Report for Application No. 22187739.2-1001, dated Dec. 20, 2022, 10 pages.

(Continued)

*Primary Examiner* — Ramesh B Patel
(74) *Attorney, Agent, or Firm* — Kilpatrick Townsend & Stockton

(57) ABSTRACT

A sampling device receives, from a transducer computing device located within a predefined proximity to an equipment in an operating environment, a vibration sample from the operating environment and increments a retrain counter. In response to determining that the incremented retrain counter does not meet or exceed a retrain threshold, the sampling device predicts, using a model, an anomalous or non-anomalous designation for the vibration sample and a cluster assignment, to a particular cluster of a set of clusters, for the vibration sample when the model predicts the non-anomalous designation for the vibration sample. The sampling device receives a subsequent vibration sample and further increments the retrain counter. In response to determining that the further incremented retrain counter exceeds a retrain threshold, the sampling device receives a subsequent set of vibration samples and retrains, using the subsequent vibration sample and the subsequent set of vibration samples, the model.

20 Claims, 5 Drawing Sheets

(56) References Cited

U.S. PATENT DOCUMENTS

| | | | | |
|---|---|---|---|---|
| 2019/0092337 | A1* | 3/2019 | Chua | B60W 30/14 |
| 2019/0370610 | A1* | 12/2019 | Batoukov | G06K 9/00523 |
| 2019/0379683 | A1* | 12/2019 | Overby | H04L 9/3265 |
| 2020/0182684 | A1* | 6/2020 | Yoskovitz | G01V 3/081 |
| 2020/0233397 | A1* | 7/2020 | Bello | G06N 20/20 |
| 2021/0334645 | A1* | 10/2021 | Pardeshi | G10L 15/16 |
| 2021/0334656 | A1* | 10/2021 | Sjögren | G05B 23/024 |
| 2022/0155771 | A1* | 5/2022 | Yeung | G05B 13/0265 |
| 2022/0163947 | A1* | 5/2022 | Michan | G06N 20/00 |
| 2022/0198562 | A1* | 6/2022 | Cella | G06Q 40/04 |

OTHER PUBLICATIONS

Corrales, J., "Fault detection and identification methodology under an incremental Tearning framework applied to industrial electromechanical systems," Universitat Politecnica de Catalunya Barcelonatech, Departament d'Enginyeria Electronica, Sep. 2017, 140 pages, downloaded on Aug. 12, 2022 from http://hdl.handle.neV10803/458451.

Carino-Corrales, J et al., "Vibration-Based Adaptive Novelty Detection Method for Monitoring Faults in a Kinematic Chain," Hindawi Publishing Corporation Shock and Vibration vol. 2016, Jan. 1, 2016, Article ID 2417856, 13 pages, downloaded on Dec. 7, 2022 from http://downloads,hindawi.com/journals/sv/2016/2417856.pdf.

Hosameldin, A. et al., "Chapter 6—Vibration-Based Condition Monitoring Using Machine Learning," In: "Condition Monitoring with Vibration Signals: Compressive Sampling and Learning Algorithms for Rotating Machines," Jan. 1, 2019, Wiley-IEEE Press, pp. 117-130, downloaded on Dec. 8, 2022 from https://ieeexplore.ieee.org/abstract/document/8958839.

Hosameldin, A. et al., "Chapter 13—Support Vector Machines (SVMs)," In: "Condition Monitoring with Vibration Signals: Compressive Sampling and Learning Algorithms for Rotating Machines," Jan. 1, 2019, Wiley-IEEE Press, pp. 259-277, downloaded on Dec. 8, 2022 from https://ebookcentral.proquest.com/lib/epo-ebooks/reader.action?docID=5964413&ppg=149>.

* cited by examiner

REAL-TIME ANALYSIS OF VIBRATION SAMPLES FOR OPERATING ENVIRONMENT CLASSIFICATION AND ANOMALY DETECTION

TECHNICAL FIELD

This disclosure generally relates to classifying input data indicating environmental conditions. More specifically, but not by way of limitation, this disclosure relates to using machine learning models to classify input data and detect input data indicating anomalous environmental conditions.

BACKGROUND

To ensure efficient use and safe operation of equipment (e.g. machines, vehicles, sensors, broadcast devices, computing devices, etc.) in various operating environments (e.g. construction sites, factories, etc.), it is important to monitor the operating environment of and/or an operating state or condition of the equipment. For example, physical vibrations may provide an indication of conditions of the equipment or in the environment of the equipment. In some instances, operators or control systems may perform actions (e.g. rerouting, disabling, or otherwise altering an operating state of the equipment) to avoid damage to the equipment itself or to an environment in a vicinity of the equipment.

In some instances, physical vibrations that are considered normal for an environment may not yet be known and it may be difficult or impossible to pre-train a single model to be able to differentiate between what physical vibrations are normal for the environment and what physical vibrations are considered anomalous. For example, in a construction site environment, a compactor equipment operating on gravel may be considered normal in some situations (e.g. where the ground of the environment is exclusively covered in gravel) and anomalous in other situations (e.g. when the compactor is operating on asphalt in the immediate environment and the surrounding environment is gravel). Accordingly, there is a need for a system that is able to learn on its own when deployed in a new environment. Also, in dynamic environments, environmental conditions change over time and it is important, in such environments, not to mistake evolving environmental conditions for anomalous environmental conditions.

Conventional supervised learning clustering models may be used to categorize a set of input data into clusters and assign new data to an existing cluster or determine that the new data is anomalous and not assignable to an existing cluster. However, conventional supervised clustering models and anomaly detection models are either not configured to be retrained or have long retraining periods and are, thus, often unable to provide accurate predictions (1) when redeployed from one environment to another and (2) in dynamic environments that experience evolving environmental conditions, resulting in hyper-classification of environmental data as anomalous. Further, the necessary retraining periods of certain conventional supervised clustering and anomaly detection models may be longer than a time period of a desired application of the model and therefore these conventional models may unsuitable for training on the fly in applications of short duration and/or may not, due to greater consumption of computing resources, be economically effective in applications of short duration.

SUMMARY

Certain embodiments involve detecting anomalies in vibration samples in an operating environment of an equipment, according to certain embodiments described in the present disclosure. A sampling computing device receives, from a transducer computing device located within a predefined proximity to an equipment in an operating environment, a vibration sample from the operating environment and increments a retrain counter in response to receiving the vibration sample. In response to determining that the incremented retrain counter does not meet or exceed a retrain threshold, the sampling computing device predicts, using a model, (1) an anomalous or non-anomalous designation for the vibration sample and (2) a cluster assignment, to a particular cluster of a set of clusters, for the vibration sample when the model predicts the non-anomalous designation for the vibration sample. The sampling computing device receives, from the transducer computing device, a subsequent vibration sample from the operating environment and further increments the retrain counter in response to receiving the subsequent vibration sample. In response to determining that the further incremented retrain counter exceeds a retrain threshold, the sampling computing device receives from the transducer computing device, a subsequent set of vibration samples from the operating environment and retrains, using the subsequent vibration sample and the subsequent set of vibration samples, the model.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
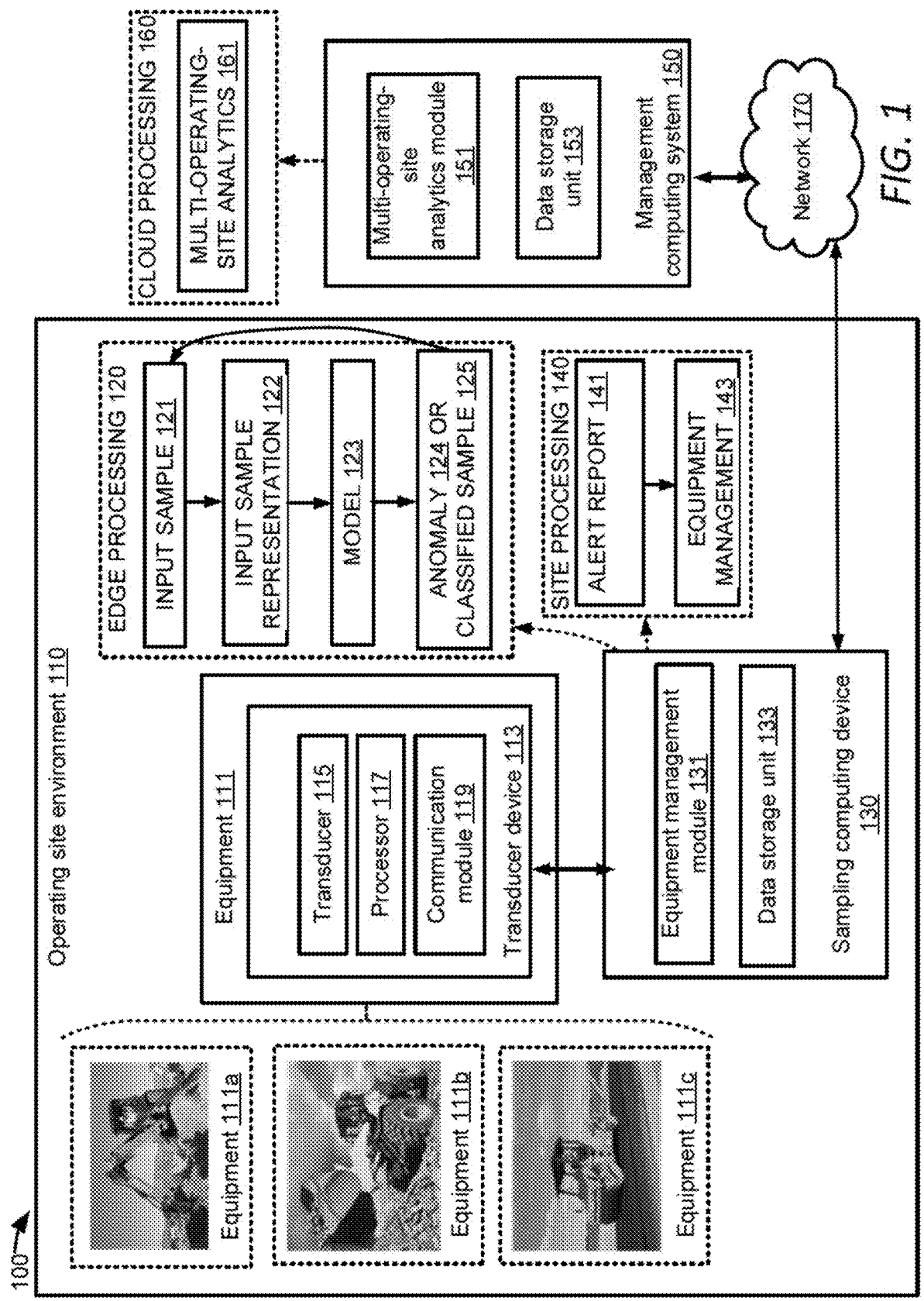
FIG. 1 depicts an example of a computing environment for classifying vibration samples in an operating environment of an equipment, according to certain embodiments described in the present disclosure.

The present disclosure involves classifying vibration samples in an operating environment of an equipment. For instance, as explained above, conventional systems designed for clustering data do not employ periodic retraining of clustering and anomaly detection models. Therefore, conventional supervised clustering systems and anomaly detection systems are not able to perform well in environments with changing environmental conditions, thereby increasing a likelihood of misidentification of input data as being anomalous. Certain embodiments described herein can avoid one or more of these problems by, for example, periodically retraining a clustering model and an anomaly detection model. The periodic retraining, using short retraining periods (e.g. a few seconds) that use less computational resources, of the machine learning clustering and anomaly detection models described in certain embodiments herein allows for adaptability to a dynamic environment and for effective use in applications of short duration, which is either not possible or not cost effective using conventional machine learning models.

The following non-limiting example is provided to introduce certain embodiments. A sampling device detects initial vibration samples from an operating environment via a transducer that is placed on or near an equipment (e.g. a construction vehicle such as a compactor). In some embodiments, the equipment interacts with an environment (e.g. a layer of asphalt under the compactor, air around the compactor, etc.), producing physical vibrations in the environment (e.g. the compactor produces a vibration by rolling over the asphalt) that the transducer detects and communicates to the sampling device. The transducer converts physical vibrations from the environment into electrical signals and the sampling device, in some embodiments, generates the vibration samples by converting the electrical signals outputted via the transducer to a digital signal format, rendering the digital signal format into a one-dimensional array, and then converting the one-dimensional array data into two-dimensional spectrogram data. In some embodiments, the sampling device detects vibration samples periodically using the transducer. For example, at every predefined period of time (e.g. at every one second), the sampling device detects, via the transducer, a new vibration sample of a predefined amount of time (e.g. a one second vibration sample).

In response to detecting a set of vibration samples of a predefined amount, the sampling device may determine clusters for the initial set of vibration samples. For example, the predefined amount comprises 5, 20, 30, 100, or other predefined number of vibration samples. In another example, the predefined amount of vibration samples comprises vibration samples detected for a predefined period (e.g. a number of vibration samples detected over a five minute period). In some embodiments, the sampling device clusters the set of vibration samples by performing a principal component analysis on the set of the predefined amount of vibration samples to reduce the vibration samples to principal components or dimensions and applying a clustering algorithm to group the set of the predefined amount of vibration samples into clusters based on the principal components analysis data. In some embodiments, the sampling device performs the principal component analysis on training data including the two-dimensional spectrogram data representing the set of vibration samples. The sampling device uses an affinity propagation algorithm to cluster the set of vibration samples based on the principal component analysis data. For example, clustering the set of vibration samples includes assigning each of set of vibration samples to a cluster of a set of clusters.

The sampling device may train a multiple class logistic regression ("MCLR") model using the set of vibration samples. In some embodiments, for each particular vibration sample of the set of initial vibration samples, particular spectrogram data corresponding to the particular vibration sample is used as training features and a particular cluster to which the particular vibration sample is assigned is used as a training target. In some embodiments, the MCLR model is an unsupervised algorithm because clusters determined based on the initial set of vibration samples do not have a ground truth to which to compare. For example, the identified clusters are not labeled with a ground truth label but merely with cluster identifiers (e.g. clusters identified as 'cluster 1,' 'cluster 2,' 'cluster 3,' 'cluster 4'). However, in some embodiments, an operator of the sampling device may provide a ground truth label (e.g. clusters labeled as 'compactor moving forward over asphalt,' 'idle compactor,' 'compactor moving in reverse over asphalt,' 'compactor moving over gravel,' etc.) to each identified cluster of vibration samples. In other embodiments, instead of training a MCLR model on the initial set of vibration samples, the sampling device trains another type of model, for example, a K-Nearest-Neighbor approach.

The sampling device may train an anomaly detection model on the set of samples. In some embodiments, the sampling computing device trains a one class support vector machine ("OCSVM") to detect anomalous vibration samples. The sampling computing device trains the OCSVM using the principal component analysis data determined from the set of initial vibration samples or using data that is determined by reducing a number of dimensions in the principal component analysis data. In some embodiments, the sampling device trains the OCSVM to predict if subsequent vibration samples correspond to an identified cluster or do not correspond to an identified cluster (an anomalous vibration sample). In the embodiments described herein, the identified clusters may or may not have ground truth labels and the OCSVM can determine if a vibration sample is anomalous (corresponds to a known cluster) whether or not the known clusters have ground truth labels.

The sampling device may collect a next vibration sample from the operating site environment. In some examples, the sampling device continues to collect vibration samples at a predefined rate (e.g. a one second vibration sample collected every one second) after (1) collecting the set of initial vibration samples, (2) clustering the set of initial vibration samples, and (3) training the anomaly detection (OVSCM) model and the cluster assignment (MCLR) model. For example, the sampling device, for the set of initial vibration samples, collected 30 subsequent one-second (1 s) vibration samples over a 30-second period and the $31^{st}$ one-second (1 s) vibration sample collected by the sampling device is the next vibration sample.

The sampling device may collect a next vibration sample and determines, using the trained anomaly detection model, whether the next vibration sample is anomalous. In some embodiments, the sampling device, when collecting a next vibration sample, determines whether a retrain counter has been exceeded before determining whether the next vibration sample is anomalous. For example, the retrain counter is exceeded if a number of collected samples exceeds the retrain counter. The number of vibration samples considered by the retrain counter may include the set of initial vibration samples plus a predetermined number of next vibration samples. If the number of detected samples exceeds the retrain counter, the sampling device collects a new set of vibration samples, clusters the set of samples, and retrains the anomaly detection model and cluster assignment model. For example, the collected next vibration sample becomes a first sample in a new initial set of samples used to retrain the models. For example, the sampling device collects a new initial set of samples, clusters the new initial set of samples, retrains the anomaly detection and cluster assignment models based on the new initial set of samples, collects a subsequent next vibration sample, and determines, using the trained anomaly detection model, whether the subsequent next vibration sample is anomalous.

If the sampling device, using the anomaly detection model, determines that the next vibration sample is an anomalous vibration sample, the sampling device may increment an alarm counter. If an alarm threshold is not exceeded after incrementing the alarm counter, the sampling device collects a subsequent next vibration sample and determines, using the anomaly detection model, whether the subsequent next vibration sample is an anomalous vibration sample. If an alarm threshold is exceeded after incrementing the alarm counter, however, the sampling device reports an alarm for the next vibration sample before collecting the subsequent next vibration sample. In some embodiments, the sampling device does not determine a cluster assignment for the anomalous vibration sample. In other embodiments, the sampling device determines a cluster assignment for the anomalous vibration sample using the trained cluster assignment model.

If the sampling device, using the anomaly detection model, determines that the next vibration sample is not an anomalous vibration sample, the sampling device may determine a cluster assignment for the next vibration sample using the trained MCLR model, report the cluster assignment for the next vibration sample, and then collect a subsequent next vibration sample. For example, the sampling device determined clusters for the set of vibration samples including cluster 1, cluster 2, cluster 3, cluster 4, and cluster 5 and then, using the trained MCLR model, determines that the next vibration sample belongs to cluster 2 and assigns the next vibration sample to cluster 2.

The sampling device continues to detect vibration samples and, for each detected vibration sample, may increment a retrain counter and also (1) determine a cluster assignment or (2) classify the vibration samples as anomalous and increments an alarm counter. When the alarm counter exceeds a threshold, the sampling device may report an alarm for the vibration sample to a management system via a network. In some embodiments, the sampling device displays the alarm via a user interface of the sampling device. In certain embodiments, the sampling device or the management system communicates instructions to an equipment associated with the anomalous samples (e.g. instructions to shut off, perform another operation), or otherwise alerts an operator of the equipment that anomalous samples have been detected. In some embodiments, as the sampling device continues to collect vibration samples, and the retrain counter exceeds a threshold, the sampling device collects a new initial set of samples, clusters the new initial set of samples, retrains the OVSCM and MCLR based on the new initial set of samples, and continues to collect subsequent next vibration samples, classify the collected samples as anomalous or as belonging to a defined cluster and/or report alarm states. In some embodiments, when the retrain counter is exceeded, the sampling device retrains the OVSCM and MCLR models using a completely new set of vibration samples. In other embodiments, the sampling device retrains the OVSCM and MCLR models using a set of previously collected samples (e.g. 30 most recently collected vibration samples) and a new set of subsequently collected vibration samples (e.g. 30 newly collected vibration samples).

In certain embodiments, as the sampling device continues to collect samples and is periodically retrained according to the retraining counter, the environment of the equipment changes. For example, as a compactor equipment compacts asphalt, physical vibrations produced in the environment by the interaction of the compactor equipment with the asphalt changes over time as the asphalt is compacted and dries. In this example, vibrations produced by the compactor equipment as it initially encounters fresh asphalt are characteristically different than vibrations produced as the compactor continues to interact with the asphalt until the asphalt is fully compacted. For example, the compactor equipment may make several passes over the asphalt to compact the asphalt. Since the sampling device periodically retrains the anomaly detection and clustering models, a baseline for the environment adapts to these changing environmental conditions and vibration samples that could otherwise be classified as anomalous (if the models were not periodically retrained) are assigned to clusters. In these examples, in the environment with changing conditions, decreasing the threshold for the retraining counter (decreasing the retraining period) results in greater number of vibration samples that are assigned to clusters and a lesser number of vibration samples that are reported as anomalous. In these examples, increasing the threshold for the retraining counter (increasing the retraining period) results in a lesser number of vibration samples that are assigned to clusters and a greater number of vibration samples that are reported as anomalous.

Example of Classifying Vibration Samples in an Operating Environment of an Equipment Referring now to the drawings, FIG. 1 depicts an example of a computing environment 100 for classifying vibration samples in an operating environment of an equipment, according to certain embodiments described in the present disclosure. In some embodiments, the computing environment 100 includes an equipment 111, a transducer device 113, a sampling computing device 130, and a management computing system 150.

In the example depicted in FIG. 1, an operating site environment 110 includes an equipment 111, a transducer device 113, and a sampling computing device 130 that communicates via a data network 170 with a management computing system 150. In some embodiments, the operating site environment 110 includes multiple equipment 111. For example, the operating site environment could be a construction site including excavator equipment 111a, bulldozer equipment 111b, and compactor equipment 111c. In examples described herein, each equipment 111 is associated with a corresponding transducer device 113. The transducer device 113 is affixed to the equipment 111, is a component of the equipment 111, or is otherwise within a predefined physical proximity to an equipment 111. The transducer device 113 is communicatively coupled with the sampling computing device 130 via a local wired or wireless communication network. In an example, the transducer device 113 and the sampling computing device 130 communicate via a Bluetooth network, a Bluetooth low energy ("BLE") network, a Wi-Fi network, a near field communication ("NFC") network, or other wireless communication network. In other embodiments, the sampling computing device 130 comprises the transducer device 113 or the sampling computing device 130 and the transducer device 113 are both components of another device (e.g. the equipment 111 is a vehicle system and the sampling computing device 130 and the transducer device 113 are components of the equipment 111).

The transducer device 113 includes a transducer 115, a processor 117, and a communication module 119. The transducer device 113, (1) detects, via the transducer 115, physical vibrations from the operating site environment 110 and converts the physical vibrations to electrical signals, (2) generates, via the processor 117, an input sample 121 based on the electrical signals generated by the transducer 113, and (3) communicates, via the communication module 119, the input sample 121 to the sampling computing device 130. The input sample 121 generated by the transducer device 113 could be a waveform ("WAV") audio file, a MPEG-1 Audio Layer III ("MP3") file, a Windows media audio ("WMA") file, or other audio file format. The transducer device 113 could comprise or could be a component of a microphone device in some embodiments. In some examples, the transducer device 113 could include a musical pickup device, for example, a banjo pickup device or a guitar pickup device.

The sampling computing device 130 receives the input sample 121 from the transducer device 113. For example, the input sample 121 is in the form of an audio file. In the example depicted in FIG. 1, the sampling computing device 130 includes an equipment management module 131 and a data storage unit 133. In some examples, the sampling computing device 130 comprises a mobile computing device.

The equipment management module 131 communicates with one or more transducer devices 113 in the operating site environment 110, where each respective transducer device 113 is associated with a respective equipment 111. In certain examples, one or more functions described as being performed by the equipment management module 131 may instead be performed via management computing system 150, which communicates with the sampling computing device 130 via the network 170. In certain embodiments, the equipment management module 131 comprises an application that enables a user (e.g. an operating site manager or an operator of one or more equipment 111) to monitor status information of one or more equipment 111 in the operating site environment 110. The user may access the application via a user interface of the sampling computing device 130. In certain examples, the application is a web browser application that communicates with the management computing system 150. In some examples, the sampling computing device 130 may execute one or more of the edge processing 120 operations or the site processing operations 140 depicted in FIG. 1 in response to receiving an input via the equipment management application from a user of the sampling computing device 130.

The data storage unit 133 includes a local or remote data storage structure accessible to the sampling computing device 130 suitable for storing information. A data storage unit can store relevant data as one or more databases, one or more matrices, computer code, etc. The data storage unit 133 may store certain training data and hyperparameters information used to train the model 123 used in the edge processing 120 operations described herein. The training data could comprise a threshold number of input samples 121 received by the sample computing device 130 from the transducer device 113. The data storage unit 133 could store anomalies 124 and classified samples 125 outputted via the model 123 (including the anomaly detection model and the clustering module). In certain examples, the sampling computing device stores raw input samples 121 received from the transducer device 113 and the sampling computing device 130 accesses a set of the stored raw input samples 121 and trains the model 123 using the set during edge processing 120.

In the embodiment depicted in FIG. 1, the sampling computing device 130 performs edge processing 120 operations for each equipment 111. In edge processing 120, the sampling computing device 130 receives input samples 121 (e.g. vibration samples) from the transducer device 113 and, for each received input sample 121, the sampling computing device 130 generates a sample representation 122 based on the received input sample 121, inputs the sample representation to the model 123, which either categorizes the input sample 121 as an anomaly 124 or outputs a classified sample 125. For example, the sampling computing device 130 performs one or more pre-processing operations on the input sample 121 audio refile received from the transducer device 113 to generate the input sample representation 122 that is then used by the model 123 to either output a classified sample 125 or detect an anomaly 124. In certain embodiments described herein, the model 123 includes an anomaly prediction model and a cluster assignment model. The classified sample 125 could be an assignment of the input sample representation 122 to a cluster of input sample representations 112 associated with previously collected input samples 121 using the cluster assignment model. As indicated in FIG. 1, edge processing 120 may be continuous. For example, the sampling computing device 130, after either determining that the previous input sample representation 122 is an anomaly 124 or generating a classified sample 125 by assigning the previous input sample representation 122 to a cluster, receives a subsequent input sample 121, preprocesses the subsequent input sample 121 to generate a subsequent input sample representation 122, and either (A) determines, using the anomaly detection model, that the subsequent input sample representation 122 is an anomaly 124 or (B) determines, using the clustering model, that the subsequent input sample representation 122 is a classified sample 125. Though not depicted in FIG. 1, edge processing 120 further includes retraining the model 123 (including the anomaly detection model and the cluster assignment model) when the number of input samples 121 received exceeds a threshold number (e.g. thirty, sixty, one hundred, or other predefined threshold number). Also, edge processing 120 could include determining that a number of detected anomalies 124 has exceeded an alarm threshold. For example, the alarm threshold comprises five, ten, twenty, or other predefined number of detected anomalies 124. In certain examples, the alarm threshold comprises a predefined number of successive detected anomalies 124 or a predefined number of detected anomalies 124 within a time period. Certain aspects of edge processing 120 operations are described in FIG. 2 at blocks 210-280.

In the embodiment depicted in FIG. 1, the sampling computing device 130 performs site processing 140 operations for each equipment 111. In site processing 140, the sampling computing device 130 generates an alert report 141. In some embodiments, site processing 140 includes performing equipment management 143 in accordance with the alert report 141. The sampling computing device 130 could generate the alert report 141 in response to determining that the number of anomalies 124 detected exceeds an alarm threshold. The alarm report 141 could include the anomalous input samples 121 (or anomalous input sample representations 122) for which the anomalies 124 were detected. The sampling computing device 130 could transmit the report to the management computing system 150. Equipment management 143 operations could include communicating instructions to the equipment 111 associated with the transducer device 113 which collected the input samples 121 corresponding to input sample representations 122 categorized by the sampling computing device 130 as anomalies 124. In some examples, the instructions could include an instruction to shut off or disable the equipment 111, disable one or more functions of the equipment 111, perform one or more operations of the equipment 111, or other appropriate instructions to address the alert report 141 generated in response to the exceeded alarm threshold. In other examples, the equipment management 143 operations could include communicating instructions to a computing device associated with an operator of the equipment 111 (e.g. a mobile device of the equipment 111 operator) with instructions for the operator of the equipment. In some examples, equipment management 143 can include communicating instructions to the equipment 111 or to an operator of the equipment 111 in accordance with classification of the input sample 121 to a known cluster from the edge processing 120 operations. Certain aspects of site processing 140 operations are described in FIG. 2 at blocks 285-290.

In the embodiment depicted in FIG. 1, the edge processing 120 operations and site processing 140 operations are performed by the sampling computing device 130. However, in some embodiments, the edge processing 120 operations and the site processing 140 operations, or one or more sub-operations of these operations, could be performed by the management computing system 150, which communicates with the sampling computing device 130 via the network 170.

The management computing system 150 executes one or more software modules that implement one or more online services for the sampling computing device 130 at the operating site environment 110 via the network 170. In certain embodiments, the management computing system 150 communicates with sampling computing devices 130 at various operating site environments 110 via the network 170. An example management computing system 150 includes a multi-operating-site analytics module 151, a data storage unit 153, and a communication module 155.

The management computing system 150 may be associated with the equipment management module 131 of the sampling computing device 130. In an example, the equipment management module 131 comprises an equipment management application resident on the sampling computing device 130 and communicates with the management computing system 130 to access one or more online services provided by the management computing system 130. Example online services could include edge processing 120 operations, site processing 140 operations, and/or cloud processing 160 operations described herein. In an example, the user of the sampling computing device 130 accesses an online service of the management computing system 150 via the network 170 and downloads the equipment management module 131 or equipment management application onto the sampling computing device 130. The multi-operating-site analytics module 151 may perform one or more operations described herein as being performed by the sampling computing device 130 or by the equipment management module 131.

An example of a data storage unit 153 includes a local or remote data storage structure accessible to the management computing system 130 suitable for storing information. A data storage unit can store relevant data as one or more databases, one or more matrices, computer code, etc. In some examples, one or more functions described herein as performed by the data storage unit 153 may be performed by a data storage unit 133 of the sampling computing device 130. In some examples, one or more functions described herein as performed by the data storage unit 133 of the sampling computing device 130 may be performed by a data storage unit 153.

One or more of the sampling computing device 130 and the management computing system 150 could include a device having a communication module capable of transmitting and receiving data over a data network 170. For instance, one or more of the sampling computing device 130 and the management computing system 150 could include a server, a desktop computer, a laptop computer, a tablet computer, a television with one or more processors embedded therein and/or coupled thereto, a smart phone, a handheld computer, or any other wired or wireless, processor-driven device.

Examples of the data network 170 include, but are not limited to, internet, local area network ("LAN"), wireless area network, wired area network, wide area network, and the like. For example, the data network 170 includes a wired or wireless telecommunication means by which network systems can communicate and exchange data. For example, each data network 170 can be implemented as, or may be a part of, a storage area network ("SAN"), a personal area network ("PAN"), a metropolitan area network ("MAN"), a LAN, a wide area network ("WAN"), a wireless LAN ("WLAN"), a virtual private network ("VPN"), an intranet, an Internet, a mobile telephone network, a card network, a Bluetooth network, a Bluetooth low energy ("BLE") network, a Wi-Fi network, a near field communication ("NFC") network, any form of standardized radio frequency, or any combination thereof, or any other appropriate architecture or system that facilitates communication of signals, data, and/or messages (generally referred to as data). It should be understood that the terms "data" and "information" are used interchangeably herein to refer to text, images, audio, video, or any other form of information that can exist in a computer-based environment.

Figure 2:
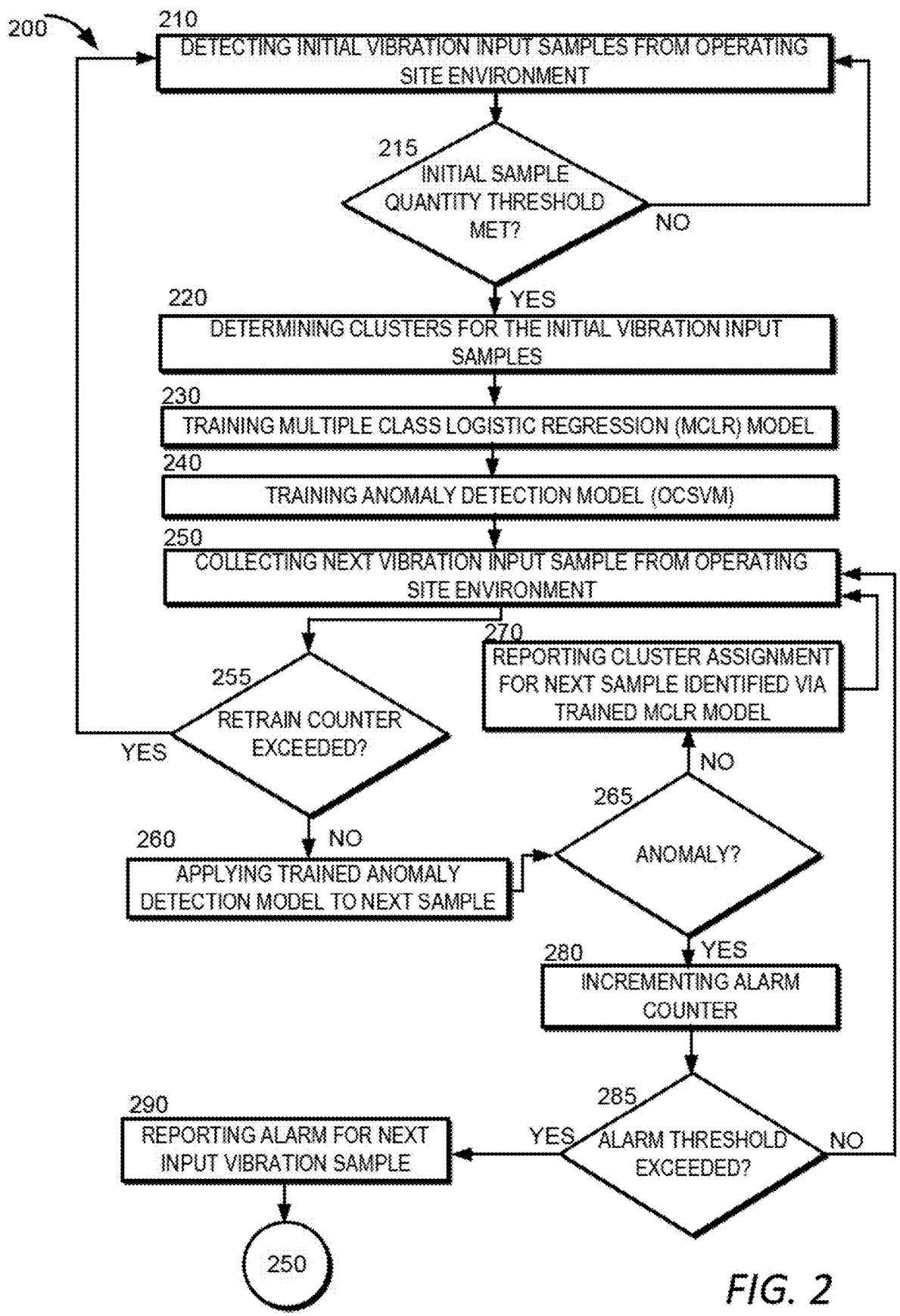
FIG. 2 depicts an example of a method for classifying vibration samples in an operating environment of an equipment, according to certain embodiments described in the present disclosure.

Examples of Operations for Classifying Vibration Samples in an Operating Environment of an Equipment FIG. 2 depicts an example of a method 200 for classifying vibration samples in an operating environment of an equipment, according to certain embodiments. For illustrative purposes, the method 200 is described with reference to the components illustrated in FIG. 1, though other implementations are possible. For example, the program code for the equipment management module 131, which is stored in a non-transitory computer-readable medium, is executed by one or more processing devices to cause the sampling computing device 130 to perform one or more operations described herein. For example, the program code for the multi-operating-site analytics module 151 and/or one or more online services provided by the management computing system 150, which is stored in a non-transitory computer-readable medium, is executed by one or more processing devices to cause the management computing system 150 to perform one or more operations described herein. The operations described herein are described as being performed by the sampling computing device 130. However, one or more of these operations described in FIG. 2 may be performed by the management computing system 150 instead of or in addition to being performed by the sampling computing device 130.

At block 210, the method 200 involves the sampling computing device 130 detecting initial vibration input samples 121 from an operating site environment 111. The sampling computing device 130 communicates with a transducer device 113 that is affixed to an equipment 111, that is a component of the equipment 111, or that is otherwise within a predefined proximity (e.g. within one meter, two meters, or other predefined distance) to the equipment 111 such that the transducer device 113 is able to detect physical vibrations in the operating site environment 110. An operating site environment 110 personnel may place the transducer device 113 in the desired location on the equipment 111 or within the predefined proximity to the equipment 111. In certain embodiments, the transducer device 113 may be attached to the equipment 111 at a particular location, for example, near an engine of the equipment 111, onto a wheelhouse or wheel well of the equipment 111, near or onto a tool of the equipment 111 with which the equipment 111 interacts with the operating site environment, or other desired location.

The transducer device 113 converts physical vibrations detected in the operating site environment 110 into electrical signals (e.g. analog voltages). In some embodiments, the sampling computing device 130 converts the electrical signals output by the transducer device 113 to digital amplitude measurements and, using a discrete Fourier transform, converts the amplitude measurements to frequency measurements. Physical vibrations can be present and detected in the operating site environment 110 in response to an interaction of the equipment 111 with the operating site environment 110, an interaction of the equipment 111 with other equipment 111, based on one or more conditions of the operating site environment 110, or other situations in which physical vibrations are detected in the operating site environment 110. For example, a specific equipment 111 (an excavator equipment 111a, a bulldozer equipment 111b, a compactor equipment 111c, or other equipment) may generate physical vibrations of specific characteristics when compared to characteristics of physical vibrations generated by another equipment 111. Also, an equipment 111 may generate vibrations with varying characteristics corresponding to an operation or state of the equipment 111 (a compactor equipment 111c could idle, drive, reverse, drive while compacting, drive without compacting, or perform some other operation or combination of operations). Also, an equipment 111 may generate vibrations with varying characteristics corresponding to an interaction of the equipment 111 with the operating environment 110, for example, with one or more substances (e.g. compacting a substance, moving over a substance, digging into a substance, etc.). Also, an equipment 111 may generate vibrations with varying characteristics corresponding to a condition, state, or other property of a substance with which the equipment 111 is interacting (e.g. a consistency of asphalt being compacted). Also, the operating environment 110 itself may generate vibrations.

Following are specific examples of types of physical vibrations that could be generated in the operating site environment 111. However, these examples are not exclusive and other situations in the operating site environment 111 not listed herein may result in detectable physical vibrations. In each of these examples, the respective physical vibration is detected by the transducer device 113 of the equipment 111. Each of the example vibrations generated in each of these examples has different characteristics from the vibrations generated in the other examples.

The Following Examples

For example, a physical vibration in the operating site environment 110 is generated in response to a compactor equipment 111c compacting a substance in the operating site environment 110. In this example, the compactor equipment 111c compacting one surface may produce a vibration with different characteristics than vibrations generated responsive to compacting other surfaces. Accordingly characteristics of physical vibrations generated by the compactor equipment 111c may change if the compactor equipment 111c transitions from one surface to another different surface. Further, in this example, the physical vibration produced by the compactor varies, even operating over the same substance, based on a hardness, a degree or level of compaction, or another physical property of the substance that is being compacted. Accordingly, characteristics of the physical vibrations generated by the compactor equipment 111c operating on one surface may change as the physical characteristics of the surface change in response to operation of the compactor equipment 111c. In another example, a physical vibration is detected in the operating site environment 110 in response to the compactor equipment 111c coming into proximity to (e.g. passing or being passed by, colliding with, etc.) another equipment (e.g. the excavator equipment 111a) in a proximity to the compactor equipment 111c such that vibrations generated by the other equipment or generated as a result of the coming into proximity with the other equipment can be detected. In yet another example, a physical vibration is generated in the operating site environment 110 corresponding to a measure of an operating state of an engine or other component of the compactor equipment 111c and characteristics of the physical vibration may change as the operating state of the engine or other component of the compactor equipment 111c changes. In another example, a physical vibration is generated in the operating site environment 110 in response to an environmental sound. In another example, a physical vibration generated in response to a physical vibration output of or caused by the equipment 111b. In another example, a physical vibration is generated by or caused by operating site personnel in the operating site environment 110. In yet another example, a physical vibration is generated in response to an environmental condition in the operating site environment 110. In another example, a physical vibration having first characteristics is generated in response to a flow of a substance through a conveyance mechanism (e.g. a tube, a pipe, a conduit, etc.) of an equipment and a physical vibration having second characteristics is generated in response to a blockage in the flow of the substance through conveyance mechanism of the equipment. In this other example, characteristics of physical vibrations can vary based on a flow rate of the substance through the conveyance mechanism, a type of substance flowing through the conveyance mechanism, or other physical property of the substance flowing through the conveyance mechanism.

In some embodiments, the transducer device 113 detects vibration samples periodically. For example, at every predefined period of time (e.g. at every one second), the transducer device 113 detects a new vibration input sample 121 of a predefined amount of time (e.g. a one second vibration sample). In certain examples, the transducer device 113, based on the electrical signals output by the transducer device 113, generates an audio file that represents each vibration input sample 121. In other examples, the transducer 113 device transmits a combined audio file that represents multiple vibration input samples 121 to the sampling computing device 130 and the sampling computing device 130 generates an audio file for each vibration input sample 121 from the combined audio file. An example audio file includes a sample rate (e.g. a number of samples per second. The sample rate can be configured. An example of an audio file representing a vibration input sample 121 is described in FIG. 3.

At block 215, the method 200 involves the sampling computing device 130 determining whether an initial sample quantity threshold is met by the detected initial vibration input samples 121. In an example, the initial sample quantity threshold is a predefined number of initial vibration input samples 121. For example, the predefined amount comprises 5, 20, 30, 100, or other predefined number of vibration samples. In another example, the predefined amount of vibration samples comprises vibration samples detected for a predefined period (e.g. a number of vibration samples detected over a five minute period). In some instances, when configuring the predefined amount, as the predefined amount is increased, an accuracy of one or more outputs generated using the anomaly detection and cluster assignment models increases but a time of a training phase is increased. In some instances, when configuring the predefined amount, as the predefined amount is decreased, an accuracy of one or more outputs generated using the anomaly detection and cluster assignment models decreases but the time of the training phase is decreased. The sampling computing device 130 could configure a training set counter to increment as the sampling computing device 130 receives each initial vibration input sample 121.

If the sampling computing device 130 determines that a number of initial vibration input samples 121 collected does not meet the initial sample quantity threshold, the method 200 returns to block 210. For example, the sampling computing device 130 receives an initial vibration input sample 121, increments the training set counter, and determines that the current value of the training set counter is less than the initial sample quantity threshold. In this example, the sampling computing device 130 proceeds to collect a subsequent initial vibration input sample 121 from the transducer computing device 113.

Returning to block 215, if the sampling computing device 130 determines that the number of initial vibration input samples 121 collected meets the initial sample quantity threshold, the method 200 proceeds to block 220. For example, the sampling computing device 130 receives an initial vibration input sample 121, increments the training set counter, and determines that the current value of the training set counter is equal to or exceeds the initial sample quantity threshold.

At block 220, the method 200 involves the sampling computing device 130 determining clusters for the initial vibration input samples 121. The sampling computing device 130 generates a training set of initial vibration input samples 121 using the initial vibration input samples 121 received from the transducer computing device 113 associated with the equipment 111. For example, in response to determining that the current value of the training set counter is equal to or exceeds the initial sample quantity threshold, the sampling computing device 130 generates a training set of initial vibration input samples 121 comprising the received initial vibration input samples 121. In some instances, in response to detecting that the current value of the training set counter is equal to or exceeds the initial sample quantity threshold, the sampling computing device 130 resets the training set counter to zero.

Figure 3:
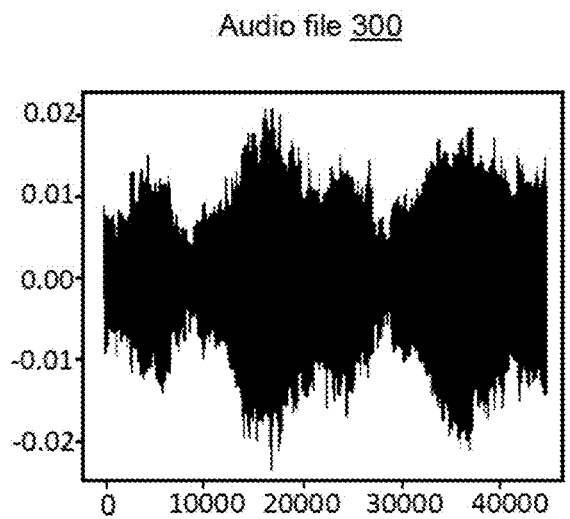
FIG. 3 depicts an illustration of example audio file representing a vibration input sample, according to certain embodiments described in the present disclosure.
Figure 4:
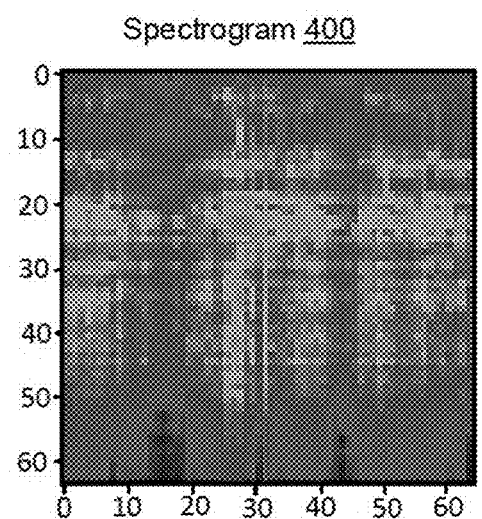
FIG. 4 depicts an illustration of an example audio spectrogram, according to certain embodiments described in the present disclosure.

In certain embodiments, the sampling computing device 130 pre-processes the initial vibration input samples 121 in the training set to generate an input sample representation 122 corresponding to each input sample 121. In some instances, each input sample 121 received by the sampling computing device 130 comprises a one-dimensional array in the time amplitude domain. An example of a vibration input sample 121 represented by a one-dimensional array is depicted in FIG. 3. In some instances, the sampling computing device 130 converts input samples 121 represented by a one-dimensional array into a 2D array which is represented as time frequency (e.g. an audio spectrogram). For example, an audio spectrogram is a two-dimensional array that represents intensities of various frequencies present in a vibration input sample 121. An example of an audio spectrogram is depicted in FIG. 4. In some instances, the sampling computing device 130 converts the spectrogram for each vibration input sample 121 back into a one-dimensional array to generate the respective input sample representation 122. The input sample representations 122 comprising one-dimensional arrays are used as input for clustering the input samples 121 as well as model 123 training (including training an anomaly detection model and a cluster assignment model).

Figure 5:
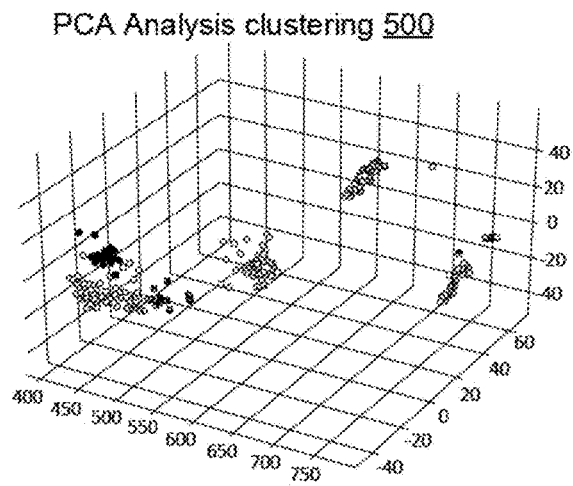
FIG. 5 depicts an illustration of example clustering of vibration input samples from performing a principal components analysis and using an affinity propagation algorithm, according to certain embodiments described in the present disclosure.

From the training set of input sample representations 122, the sampling computing device 130 determines a ground truth for model 123 training. In some instances, the sampling computing device 130 performs a principal component analysis ("PCA") on the training set of input sample representations 122. PCA identifies the principal aspects or dimensions of the data. Once the training set has been reduced to these principal dimensions, the sampling computing device 130 uses a cluster algorithm (e.g. an affinity propagation algorithm) to cluster the input sample representations 122 (representing initial vibration input samples 121) into a set of clusters and assign each input sample representation 122 of the training set to a respective cluster of the set of clusters. In some examples, the sampling computing device 130 uses a k-nearest-neighbors ("KNN") clustering algorithm to cluster the input sample representations 122. In some instances, the number of dimensions determined via PCA is large and the sampling computing device 130 reduces the dimensions determined via PCA to a lower number of dimensions (e.g. to a smaller dimensional space). In some examples, the PCA reduces the number of dimensions to a predefined number of dimensions (e.g. three dimensions, five dimensions, ten dimensions). In some instances, the affinity propagation algorithm used to cluster the PCA reduced dimensional data determined from the training set of input sample representations 122 is an unsupervised algorithm. Accordingly, the clusters that are discovered in the PCA do not have a ground truth. However, in some instances, the sources of different input samples 121 could be controlled. An example clustering of input sample representations 122 (corresponding to a training set of initial vibration input samples 121) via PCA and an affinity propagation algorithm is depicted in FIG. 5.

At block 230, the method 200 involves the sampling computing device 130 training a multiple class logistic regression ("MCLR") model. The MCLR model is a cluster assignment model and is trained to assign a vibration input sample 121 that is not part of the training set to a cluster of the set of clusters that were determined via the PCA. In an example, the two-dimensional spectrogram derived from the received vibration input sample 121 for each vibration input sample 121 of the set of training data is used as training features for training the MCLR model and the respective cluster to which the input sample representation 122 corresponding to the initial vibration input sample 121 belongs (as determined by the affinity propagation algorithm based on the PCA dimensional data) is used as a training target. In some instances, the dimensional data from the PCA analysis of the training set of input sample representations 122 is used to train the MCLR model. In some instances, the sample computing device 130 clusters the input sample representations 122 of the training set to form a ground truth based on the reduced-dimension PCA dimensional data and then trains the model using the full (non-reduced) PCA dimension data to train the MCLR model. In some embodiments, instead of a MCLR model, the cluster assignment model is another type of clustering model, for example a K Nearest Neighbor model, and the sampling computing device 130 trains the clustering assignment model.

At block 240, the method 200 involves the sampling computing device 130 training an anomaly detection model. In an example embodiment, the anomaly detection model comprises a one class support vector machine ("OCSVM"). The sampling computing device 130 trains the anomaly detection model using the reduced dimensional data discovered via the PCA from training set of input sample representations 122. However, in some instances, the sampling computing device 130 could train the anomaly detection model using the complete dimensional data discovered via the PCA of the training set. In certain embodiments, once trained, the anomaly detection model is able to output a confidence score or probability that represents a likelihood that an input sample representation 122 is anomalous or non-anomalous and a classification of the input sample representation 122 as anomalous or non-anomalous based on comparing the confidence score or probability to a threshold.

At block 250, the method 200 involves the sampling computing device 130 collecting a next vibration input sample 121 from the operating site environment 110. The sampling computing device 130 receives a next vibration input sample 121 from the transducer computing device 113 as described previously in block 210 with respect to each of the received initial vibration input samples 121 that were used to generate the training set. For example, the transducer computing device 113 detects physical vibrations in the operating site environment 110, generates the next input sample 121 based on the detected physical vibrations, and transmits the next input sample 121 to the sampling computing device 130. In this example, the sampling computing device 121 receives the next input sample 121 from the transducer computing device 113.

At block 255, the method 200 involves the sampling computing device 130 determining if a retrain counter is exceeded. In some instances, after performing model 143 training operations, each time the sampling computing device 130 receives an input sample 121 from the transducer computing device 113, the sampling computing device 130 increments a retrain counter. The retrain counter corresponds to a retrain threshold and, when the retrain counter meets or exceeds the retrain threshold, the sampling computing device 130 begins to collect a new training set of initial vibration input samples 121. In some instances, the retrain counter begins at zero when the model is trained and is incremented after each subsequent new input sample 121 is received. The sampling computing device 130 could configure a training set counter to increment as the sampling computing device 130 receives each initial vibration input sample 121. In some instances, when configuring the retrain threshold, as the retrain threshold is increased, a probability of a misidentification of a next input sample 121 as an anomaly 124 (when it otherwise would be identified as a non-anomaly) increases, particularly in a dynamic operating site environment 110. In some instances, when configuring the retrain threshold, as the retrain threshold is decreased, a probability of a misidentification of a next input sample 121 as an anomaly 124 decreases, particularly in a dynamic operating site environment 110.

If the sampling computing device 130 determines that the retrain threshold is exceeded, the method 200 returns to block 210. For example, the retrain threshold is 51 samples and, in response to receiving a current input sample 121, the sampling computing device 130 increments the retrain counter from 50 to 51, meeting the retrain threshold.

In some embodiments, if the sampling computing device 130 determines that the retrain threshold is met or exceeded, the sampling computing device 130 resets the retrain counter and substantially repeats operations described in blocks 210-240 to retrain the anomaly detection and clustering models. For example, the sampling computing device 130 continues to receive subsequent input samples 121 from the transducer computing device 113, incrementing a training set counter at the receipt of each subsequent input sample 121 until the training set counter meets or exceeds an initial sample quantity threshold to generate a new training set of initial vibration input samples 121. The sampling computing device performs a PCA of the new training set, an initial clustering of the new training set using a clustering algorithm and to re-train the anomaly detection and cluster assignment models. In some instances, the sampling computing device 130 resets the retrain counter to zero in response to determining that the retrain threshold is exceeded and begins to increment the retrain counter upon receiving input samples 121 subsequent to retraining the anomaly detection and clustering models.

In other embodiments, instead of using a completely new set of input vibration samples 121 to retrain the models, the sampling computing device 130 periodically retrains the models using overlapping training sets. For example, when the sampling computing device 130 determines that the retrain threshold is met or exceeded, the sampling computing device 130 resets the retrain counter and retrains the anomaly detection and clustering models as described in blocks 210-240, except the training set of vibration samples for retraining the anomaly detection model and the cluster assignment model overlaps with the training set that was used to previously train these models. For example, the sampling computing device 130 initially trains the models on a set of thirty (30) input vibration samples 121. In this example, the sampling computing device 130 receives ten (10) subsequent input vibration samples 121 from the transducer computing device 113, incrementing the retrain counter upon receipt of each of the subsequent input vibration samples 121 until it meets a retrain threshold of ten (10) vibration samples. In this example, the sampling computing device 130 retrains the models using the last (chronologically) twenty (20) of the input vibration samples 121 from the initial set of input vibration samples 121 plus the ten (10) subsequently received input vibration samples 121 to re-train the models.

Returning to block 255, if the sampling computing device 130 determines that the retrain threshold is not exceeded, the method 200 proceeds to block 260. For example, the retrain threshold is 51 samples and, in response to receiving a current input sample 121, the sampling computing device 130 increments the retrain counter from 39 to 40, which is less than the retrain threshold.

At block 260, the method 200 involves the sampling computing device 130 applying the trained anomaly detection model to the next vibration input sample 121. In an example, the sampling computing device 130 inputs the next vibration input sample 121 to the trained anomaly detection model. In some instances, the sampling computing device 130 performs one or more preprocessing operations on the next vibration input sample 121 to generate an input sample representation 122. For example, the next vibration input sample 121 comprises a one-dimensional array and the sampling computing device 130 generates an input sample representation 122 from the next vibration input sample 121 comprising a two-dimensional spectrogram and inputs the two-dimensional spectrogram to the trained anomaly detection model. The trained anomaly detection model either outputs an anomaly 124 designation or a non-anomaly designation for the next vibration input sample 121 based on the input data corresponding to the next vibration input sample 121.

Figure 7:
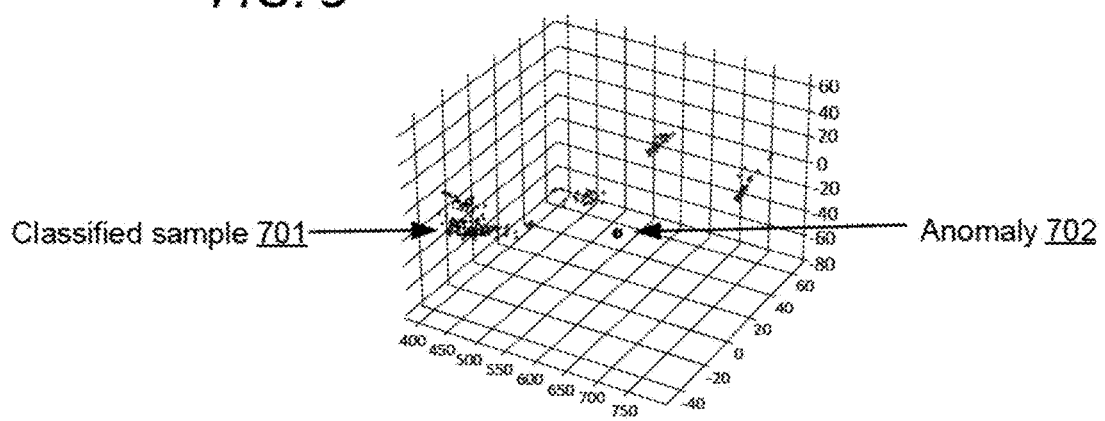
FIG. 7 depicts an illustration of an anomalous next vibration input sample and a non-anomalous next vibration input sample comprising a cluster assignment, according to certain embodiments described in the present disclosure.

At block 265, the method 200 involves the sampling computing device 130 determining if the output of the trained anomaly detection model for the next vibration input sample 121 is an anomaly 124. In an example, the sampling computing device 130 inputs the input data corresponding to the next vibration input sample 121 to the anomaly detection model (e.g. the OCSVM), which either outputs an anomalous designation or a non-anomalous designation for the next vibration input sample 121. In some instances, the trained anomaly detection model outputs one of a first output value or a second output value, the first output value corresponding to an anomaly 124 designation and the second output value corresponding to a non-anomaly designation. FIG. 7 provides an example illustration of an anomalous next vibration input sample 121 and a non-anomalous next vibration input sample 121 comprising a cluster assignment.

If the sampling computing device 130 determines that the output of the trained anomaly detection model for the next vibration input sample 121 is not an anomaly 124, the method 200 proceeds to block 270. For example, the anomaly detection model (e.g. the OCSVM) outputs a non-anomaly designation for the next vibration input sample 121.

Figure 6:
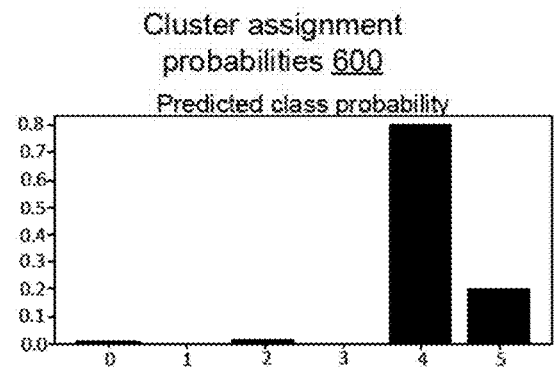
FIG. 6 depicts an illustration of cluster assignment probabilities predicted for a next vibration input sample, according to certain embodiments described in the present disclosure.

At block 270, the method 200 involves the sampling computing device 130 reporting a cluster assignment the next vibration input sample 121 identified via the trained MCLR model. The sampling computing device 130 inputs the next vibration input sample 121 to the trained cluster assignment model (MCLR model). In some embodiments, the sampling computing device 130 performs one or more preprocessing operations on the next vibration input sample 121 to generate an input sample representation 122. For example, the next vibration input sample 121 comprises a one-dimensional array and the sampling computing device 130 generates an input sample representation 122 from the next vibration input sample 121 comprising a two-dimensional spectrogram and inputs the two-dimensional spectrogram to the trained cluster assignment model. The trained cluster assignment model outputs, for the input data corresponding to the next vibration input sample 121, a cluster assignment for the next vibration sample 121 corresponding to a cluster of a set of clusters. For example, during a training phase, the set of clusters was determined on the training set of initial input samples 121 collected prior to the collection of the next input sample 121 by (1) performing a PCA on the training set to determine dimensional data, and (2) using the dimensional data, generating the set of clusters and assigning each of the training set of initial input samples 121 to a cluster of the set of clusters using an affinity propagation algorithm. The cluster assignment for the next vibration input sample 121 corresponds to a cluster of the set of clusters determined during the training phase. In certain examples, the cluster assignment model determines a probability, for the next vibration input sample 121, that the next vibration input sample 121 should be assigned to each cluster of the set of clusters. FIG. 6 depicts an illustration of probabilities that a next vibration input sample belongs to each cluster of a set of clusters.

Reporting the determined cluster assignment for the next vibration input sample 121 could include one or more of saving the determined cluster assignment in a data storage unit 133 of the sampling computing device 130 and communicating the determined cluster assignment for the next vibration input sample 121 to the management computing system 150 via the network 170.

From block 270, the method 200 returns to block 250. For example, after determining a cluster assignment for a next vibration input sample 121, the sampling computing device 130 substantially repeats operations described in one or more of blocks 250, 255, 260, 265, and 270, as appropriate. For example, the sampling computing device 130 receives a subsequent next vibration input sample 121, inputs input data determined from the subsequent next vibration input sample 121 to the trained anomaly detection model and/or the trained cluster assignment model, as appropriate.

Returning to block 265, if the sampling computing device 130 determines that the output of the trained anomaly detection model for the next vibration input sample 121 is an anomaly 124, the method 200 proceeds to block 280. For example, the anomaly detection model (e.g. the OCSVM) outputs an anomaly designation for the next vibration input sample 121.

At block 280, the method 200 involves the sampling computing device 130 incrementing an alarm counter. The alarm counter is configured to trigger an alarm report when the sampling computing device 130 determines that the alarm counter meets or exceeds an alarm threshold. In some instances, the sampling computing device 130 increments the alarm counter each time the trained anomaly detection model outputs an anomaly 124 designation for a next vibration input sample 121. In some instances, the sampling computing device 130 resets the alarm counter to zero if, after incrementing the alarm counter, the trained anomaly detection model outputs a non-anomaly designation for the following next vibration input sample 121. In some instances, the sampling computing device 130 increments, for a threshold amount of time (e.g. ten seconds), the alarm counter each time the trained anomaly detection model outputs a non-anomaly designation during the threshold length of time and then resets the alarm counter after the threshold amount of time passes. In some instances, the sampling computing device resets the alarm counter to zero when the alarm counter meets or exceeds the alarm threshold.

In some instances, when configuring the alarm threshold, as the alarm threshold is increased, a speed at which an the sampling computing device 130 reports an alarm will be decreased as the sampling computing device 130 detects a series of anomalies 140 using the trained anomaly detection model. In some instances, when configuring the alarm threshold, as the alarm threshold is decreased, a speed at which an the sampling computing device 130 reports an alarm will be increased as the sampling computing device 130 detects a series of anomalies 140 using the trained anomaly detection model. Accordingly, decreasing the alarm threshold results in an alarm that is more sensitive for anomalous sample detection while increasing the alarm threshold results in an alarm that is less sensitive for anomalous sample detection. Further, determining when and how the alarm counter is reset, as described previously, can also effect a sensitivity of the alarm.

At block 285, the method 200 involves the sampling computing device 130 determining if an alarm threshold is exceeded. For example, after incrementing the alarm counter in response to determining an anomaly 124 designation for the next vibration input sample 121, the sampling computing device 130 compares the incremented alarm counter value to the alarm threshold value.

If the sampling computing device 130 determines that the alarm threshold is not exceeded, the method 200 returns to block 250. For example, an alarm threshold is ten anomaly 124 designations, the sampling computing device 130 increments the alarm counter from eight to nine, and determines that the current alarm counter value (nine) is less than the alarm threshold (ten). In this example, after determining that the alarm threshold is not exceeded in response to incrementing the alarm counter, the sampling computing device 130 substantially repeats operations described in one or more of blocks 250, 255, 260, 265, 270, 280, and 285 as appropriate. For example, the sampling computing device 130 receives a subsequent next vibration input sample 121, inputs input data determined from the subsequent next vibration input sample 121 to the trained anomaly detection model and/or the trained cluster assignment model, as appropriate.

Returning to block 285, if the sampling computing device 130 determines that the alarm threshold is exceeded, the method 200 proceeds to block 290. For example, an alarm threshold is ten anomaly 124 designations, the sampling computing device 130 increments the alarm counter from nine to ten, and determines that the current alarm counter value meets the alarm threshold.

At block 290, the method 200 involves the sampling computing device 130 reporting an alarm for the next input vibration sample 121. Reporting the alarm for the next vibration input sample 121 could include one or more of generating an alarm report 141, saving the alarm report 141 in a data storage unit 133 of the sampling computing device 130 and communicating the alarm report 141 to the management computing system 150 via the network 170. The alarm report 141 could include the next vibration input sample 121 as well as one or more previous vibration input samples 121 for which the sampling computing device 130 detected an anomaly 124 and incremented the alarm counter. In certain examples, an operator of the sampling computing device 130 or an operator of the management computing system 150 could review the vibration input samples 121 associated with the reported alarm report 141 and take one or more actions with respect to the equipment 111 or the operating site environment 110 to address the alarm report 141.

In an example, the equipment 111 is a compactor that is compacting an asphalt surface and then begins to run over gravel, producing an anomalous physical vibration when compared to previous physical vibrations detected while compacting the asphalt service. In another example, the compactor equipment 111 is compacting an asphalt surface and another vehicle begins operating within a proximity to the compactor equipment 111 detectible by the transducer device 113, producing an anomalous physical vibration when compared to previous physical vibrations produced while compacting the asphalt service without the other vehicle operating in the proximity. In these examples, after successive anomaly 124 designations are determined for next vibration input samples 121 received from the transducer 113 detecting the anomalous physical vibrations in the operating site environment 110, the sampling computing device 130 reports an alarm for the anomalous vibration input samples 121.

From block 290, the method 200 returns to block 250. In some examples, after reporting the alarm, the sampling computing device 130 resets the alarm counter to zero and substantially repeats operations described in one or more of blocks 250, 255, 260, 265, and 270, as appropriate. For example, the sampling computing device 130 receives a subsequent next vibration input sample 121, inputs input data determined from the subsequent next vibration input sample 121 to the trained anomaly detection model and/or the trained cluster assignment model, as appropriate. In other examples, from block 290, the method 200 returns to block 210 and the sampling computing device 130 substantially repeats operations described in blocks 210-240 to retrain the anomaly detection and clustering models before proceeding to substantially repeat operations described in one or more of blocks 250, 255, 260, 265, and 270, as appropriate, for example, inputting input data determined from the subsequent next vibration input sample 121 to the retrained anomaly detection model and/or the retrained cluster assignment model, as appropriate.

In certain examples, responsive to determining an anomaly 124 designation for a next vibration input sample 121, responsive to determining a cluster assignment for a next vibration input sample 121, or responsive to reporting an alarm (e.g. generating an alarm report 141), the sampling computing device 130 performs one or more equipment management 143 operations, as depicted in FIG. 1. For example, performing equipment management 143 operations could include communicating with the equipment 111 or one or more devices associated with the equipment 111 to transmit instructions to disable the equipment 111 (e.g. disable an engine of the equipment 111), disable one or more operations of the equipment 111, perform one or more operations of the equipment 111 (e.g. direct compactor equipment 111 to stop, turn, go in reverse, etc.). For example, the equipment 111 is a compactor that is compacting an asphalt surface and then begins to run over gravel, producing an anomalous physical vibration when compared to previous physical vibrations detected while compacting the asphalt service, which results in the sampling computing device 130 reporting an alarm. In this example, performing equipment management 143 operations could include directing the compactor to apply the brakes, disabling the compactor, or directing the compactor to turn or go in reverse to avoid the gravel and/or return to the asphalt surface.

In certain embodiments, the sampling computing device 130 logs geolocation data (e.g. location coordinates) and/or logs a timestamp and transmits the geolocation data and/or timestamp along with each determined cluster assignment and/or determined anomalous (or non-anomalous) designation for each next vibration sample to the management computing system 150. In these embodiments, the management computing system 150 may map or otherwise correlate the location and/or time information with cluster assignment information (or anomalous/non-anomalous designation) of the next vibration sample. In certain embodiments, the management computing system 150 may provide the correlated location, time, and/or cluster/anomaly information for display in a user interface, for example, on a user interface of the sampling computing device 130.

FIG. 3 depicts an illustration of example audio file 300 representing a vibration input sample 121, according to certain embodiments described in the present disclosure. This illustration of the example audio file 300 includes a one-dimensional array represented by a horizontal axis representing a time dimension and a vertical axis representing an intensity of a signal at a moment. The signal is discretely measured at each sampling interval.

FIG. 4 depicts an illustration of an example audio spectrogram, according to certain embodiments described in the present disclosure. In certain embodiments, signals that are captured by the sampling computing system via the transducer computing device 113 are converted from the one-dimensional array format depicted in FIG. 3 to the audio spectrogram 400 format as depicted in FIG. 4. The spectrogram 400 is a two-dimensional array that represents an intensity of various frequencies present in the audio signal across a time range. The spectrogram 400 illustrated in FIG. 4 is a spectrogram for a one-second vibration input sample 121. Once the spectrogram 400 is rendered from a sample waveform (e.g. the audio file, the one-dimensional array), the spectrogram could be converted back into a one-dimensional array, which can be used as input for dimensional reduction and model 143 training.

FIG. 5 depicts an illustration of example PCA clustering 500 of vibration input samples. The PCA clustering is conducted by performing a PCA to determine dimensional data and then using an affinity propagation algorithm to cluster the samples using the dimensional data, according to certain embodiments described in the present disclosure. The PCA clustering 500 represents a clustering of sample spectrograms. Each dot on the graph in FIG. 5 represents a sample. In some instances, the samples take the form of a flatted 64×65 matrix, and therefore, have a dimensionality of 4260. In some instances, this highly dimensional data is reduced to a much smaller dimensional space, as shown in the PCA clustering 500, which shows a three-dimensional space. However, the number of dimensions in the reduced dimensional data is configurable and a larger number of dimensions than three could be used. In some instances, increasing the number of dimensions for the reduced dimensional data increases an accuracy of the clustering but also increases an amount of processing required to apply the clustering algorithm. In some instances, decreasing the number of dimensions for the reduced dimensional data decreases the accuracy of the clustering but also decreases the amount of processing required to apply the clustering algorithm.

FIG. 6 depicts an illustration of cluster assignment probabilities 600 predicted for a next vibration input sample, according to certain embodiments described in the present disclosure. In an example, the sampling computing device 130 inputs a next vibration input sample 121 (or an input sample representation 122 determined from the next vibration input sample 121, for example, a spectrogram) to the cluster assignment model (MCLR model). In this example, the cluster assignment model is trained to assign the next vibration input sample 121 or input sample representation 122 to a cluster of a set of clusters. In the example depicted in FIG. 6, the trained cluster assignment module is trained to assign a next vibration input sample 121 to one of six unlabeled clusters identified simply as "0," "1," "2," "3," "4," and "5." In this example, the cluster assignment model determines a cluster affinity for each of the six clusters, as depicted in FIG. 6. In this example, as shown in FIG. 6, cluster 4 has the highest affinity value, followed by cluster 5 with the second highest affinity value, followed by cluster 2 with the third highest affinity value, followed by cluster 0 with the fourth highest affinity value, followed by clusters 1 and 3, which each have the fifth highest affinity value. In this example, the sampling computing device 130 assigns the next vibration input sample 121 to cluster 4, because cluster 4 has the greatest affinity value of the six clusters as determined by the trained cluster assignment model.

FIG. 7 depicts an illustration of an anomalous next vibration input sample and a non-anomalous next vibration input sample comprising a cluster assignment, according to certain embodiments described in the present disclosure. In this example, an anomaly 702 and a classified sample 701 are illustrated in a three-dimensional space. In this example, the sampling computing device 130 inputs a next vibration input sample 121 (or an input sample representation 122 determined from the next vibration input sample 121, for example, a spectrogram) into the anomaly detection module and the anomaly detection module outputs an anomaly 124 designation for the next vibration input sample 121. In some instances, the sampling computing device 130 does not input the next vibration input sample 121, now classified as an anomaly 124, into the cluster assignment model. However, the sampling computing device 130 could input the next vibration input sample 121 into the cluster assignment model and determine a cluster for the anomaly 124 in some instances. In this example, the sampling computing device 130 inputs a subsequent next vibration input sample 121 (or a subsequent input sample representation 122 determined from the subsequent next vibration input sample 121, for example, a spectrogram) into the anomaly detection module and the anomaly detection module outputs a non-anomaly designation for the subsequent next vibration input sample 121. In response to determining the non-anomaly designation, the sampling computing device 130 inputs the subsequent next vibration input sample 121 (or the subsequent input sample representation 122 determined from the subsequent next vibration input sample 121, for example, a spectrogram) into the cluster assignment model, which determines a cluster assignment for the subsequent next vibration input sample 121. FIG. 7 illustrates a location within a three-dimensional space (determined via PCA) of the subsequent next vibration input sample 121, now the classified sample 701 in comparison to other input samples 121 that have already been clustered, which are represented by the other dots in the three-dimensional space.

Example of a Computing System for Implementing Certain Embodiments

Figure 8:
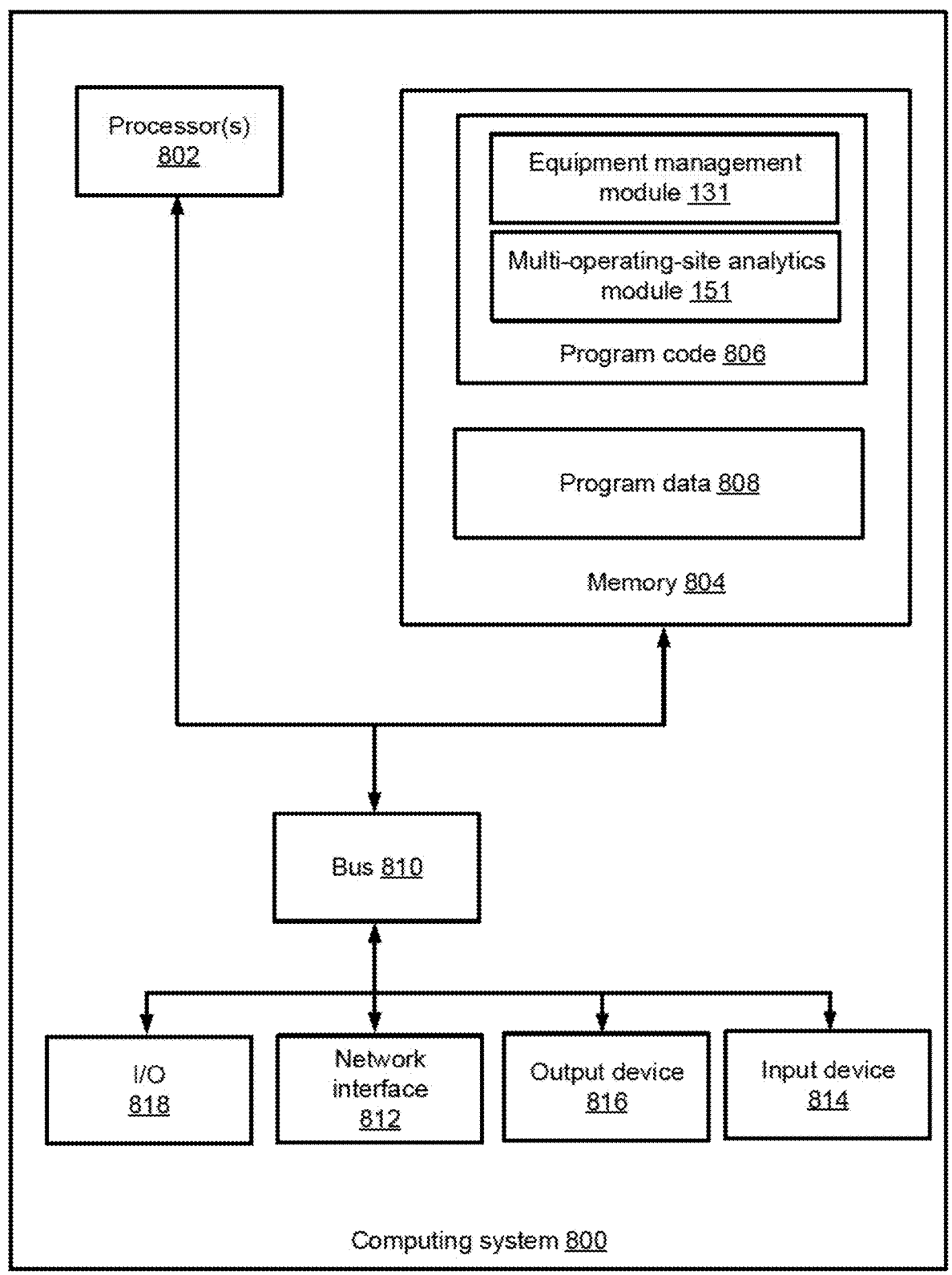
FIG. 8 depicts an example of a computing system that performs certain operations described herein, according to certain embodiments described in the present disclosure.

Any suitable computing system or group of computing systems can be used for performing the operations described herein. For example, FIG. 8 depicts an example of a computing system 800. The computing system 800 includes the management computing system 150.

The depicted examples of a computing system 800 includes a processor 802 communicatively coupled to one or more memory devices 804. The processor 802 executes computer-executable program code stored in a memory device 804, accesses information stored in the memory device 804, or both. Examples of the processor 802 include a microprocessor, an application-specific integrated circuit ("ASIC"), a field-programmable gate array ("FPGA"), or any other suitable processing device. The processor 802 can include any number of processing devices, including a single processing device.

The memory device 804 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions.

The computing system 800 executes program code 806 that configures the processor 802 to perform one or more of the operations described herein. The program code 806 includes, for example, the equipment management module 131 and the multi-operating-site analytics module 151, or other suitable applications that perform one or more operations described herein. The program code 806 may be resident in the memory device 804 or any suitable computer-readable medium and may be executed by the processor 802 or any other suitable processor. The program code could include processor-specific instructions generated by a compiler or an interpreter from code written in any suitable computer-programming language, including, for example, C, C++, C#, Visual Basic, Java, Python, Perl, JavaScript, and ActionScript.

In some embodiments, program code 806 for implementing both the equipment management module 131 and the multi-operating-site analytics module 151 are stored in the memory device 804, as depicted in FIG. 8. In additional or alternative embodiments, program code 806 for implementing one or more of the equipment management module 131 and the multi-operating-site analytics module 151 are stored in different memory devices of different computing systems. In additional or alternative embodiments, the program code 806 described above is stored in one or more other memory devices accessible via a data network.

The computing system 800 can access program data 807, which includes one or more of the datasets described herein (e.g., training set data, cluster assignments, anomaly 124 or non-anomaly designations), in any suitable manner. In some embodiments, some or all of one or more of these data sets, models, and functions are stored as the program data 807 in the memory device 804, as in the example depicted in FIG. 8. In additional or alternative embodiments, one or more of these data sets, models, and functions are stored in the same memory device (e.g., one of the memory device 804). For example, a common computing system, such as the management computing system 150 depicted in FIG. 1, can hardware, software, or both that implements the equipment management module 131 and the multi-operating-site analytics module 151. In additional or alternative embodiments, one or more of the programs, data sets, models, and functions described herein are stored in one or more other memory devices accessible via a data network.

The computing system 800 also includes a network interface device 812. The network interface device 812 includes any device or group of devices suitable for establishing a wired or wireless data connection to one or more data networks. Non-limiting examples of the network interface device 812 include an Ethernet network adapter, a modem, and the like. The computing system 800 is able to communicate with one or more other computing devices (e.g., sampling computing device 130) via a data network using the network interface device 810.

The computing system 800 may also include a number of external or internal devices, such as input or output devices. For example, the computing system 800 is shown with one or more input/output ("I/O") interfaces 818. An I/O interface 818 can receive input from input devices or provide output to output devices. One or more buses 810 are also included in the computing system 800. The bus 810 communicatively couples one or more components of a respective one of the computing system 800.

In some embodiments, the computing system 800 also includes the input device 814 and the presentation device 816 depicted in FIG. 8. An input device 814 can include any device or group of devices suitable for receiving visual, auditory, or other suitable input that controls or affects the operations of the processor 802. Non-limiting examples of the input device 814 include a touchscreen, a mouse, a keyboard, a microphone, a separate mobile computing device, etc. A presentation device 816 can include any device or group of devices suitable for providing visual, auditory, or other suitable sensory output. Non-limiting examples of the presentation device 816 include a touchscreen, a monitor, a speaker, a separate mobile computing device, etc.

Although FIG. 8 depicts the input device 814 and the presentation device 816 as being local to the computing device that executes the program code 806, other implementations are possible. For instance, in some embodiments, one or more of the input device 814 and the presentation device 816 can include a remote client-computing device that communicates with the computing system 800 via the network interface device 812 using one or more data networks described herein.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computer systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

Figure 9:
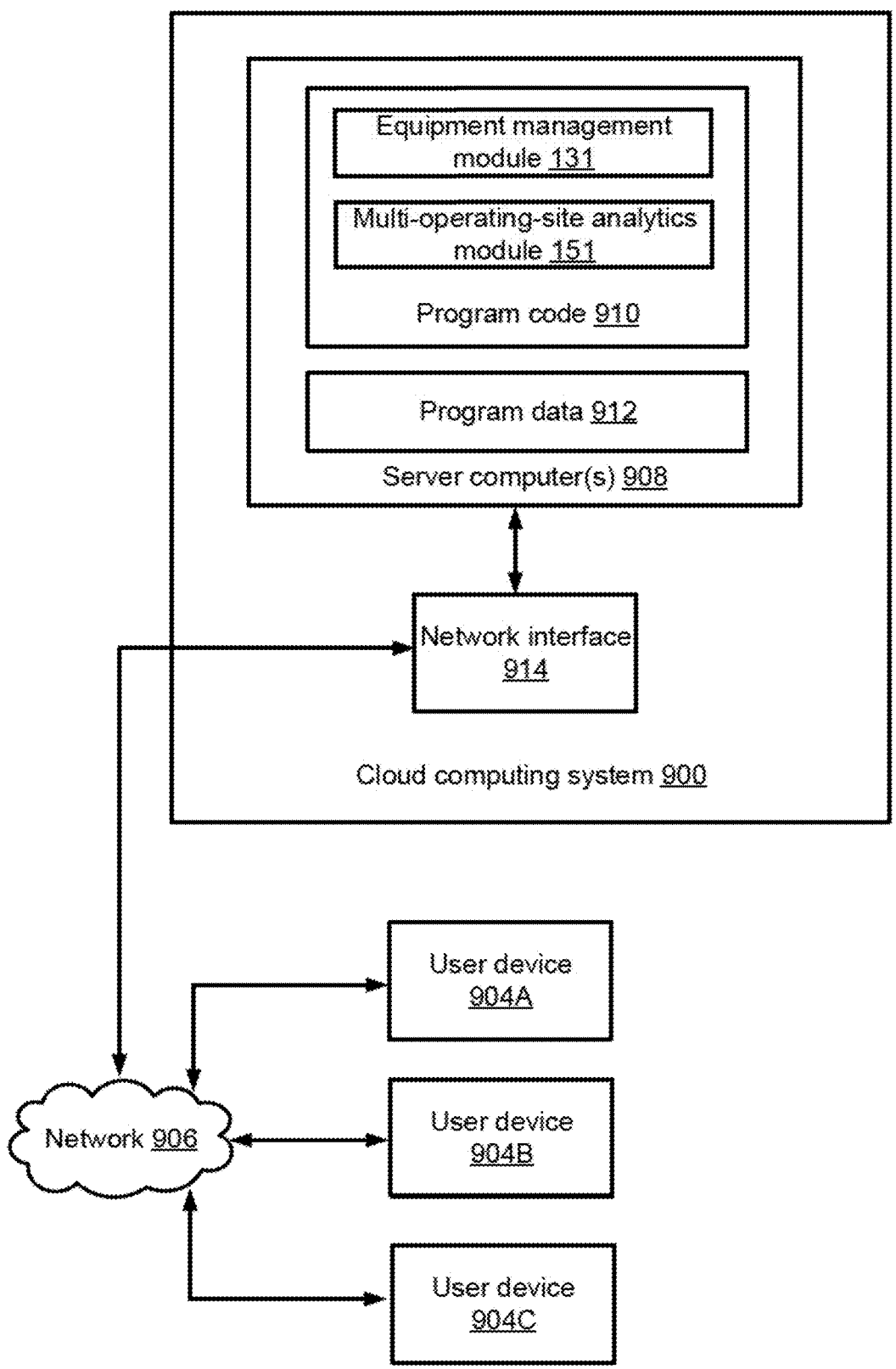
FIG. 9 depicts an example of a cloud computing system that performs certain operations described herein, according to certain embodiments described in the present disclosure.

In some embodiments, the functionality provided by computer system 800 may be offered as cloud services by a cloud service provider. For example, FIG. 9 depicts an example of a cloud computer system 900 offering an equipment management module 131 and a multi-operating-site analytics module 151 that can be used by a number of user subscribers using user devices 904A, 904B, and 904C across a data network 906. In the example, the equipment management module 131 and the multi-operating-site analytics module 151 may be offered under a Software as a Service (SaaS) model. One or more users may subscribe to the next event prediction and dynamic clustering service, and the cloud computer system 900 performs the equipment management module 131 and the multi-operating-site analytics module 151 to subscribers. For example, the cloud computer system 900 performs services comprising one or more of steps or functions illustrated in FIG. 1 and FIG. 2 and described herein. The cloud computer system 900 may include one or more remote server computers 908.

The remote server computers 908 include any suitable non-transitory computer-readable medium for storing program code 910 (e.g. the equipment management module 131 and the multi-operating-site analytics module 151) and program data 912, or both, which is used by the cloud computer system 900 for providing the cloud services. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. In various examples, the server computers 908 can include volatile memory, non-volatile memory, or a combination thereof.

One or more of the server computers 908 execute the program code 910 that configures one or more processors of the server computers 908 to perform one or more of the operations that provide one or more methods described herein (e.g. the methods of FIG. 1 and FIG. 2 described herein). As depicted in the embodiment in FIG. 9, the one or more servers may implement the equipment management module 131 and the multi-operating-site analytics module 151. Any other suitable systems or subsystems that perform one or more operations described herein (e.g., one or more development systems for configuring an interactive user interface) can also be implemented by the cloud computer system 900.

In certain embodiments, the cloud computer system 900 may implement the services by executing program code and/or using program data 912, which may be resident in a memory device of the server computers 908 or any suitable computer-readable medium and may be executed by the processors of the server computers 908 or any other suitable processor.

In some embodiments, the program data 912 includes one or more datasets and models described herein. Examples of these datasets include training data. In some embodiments, one or more of data sets, models, and functions are stored in the same memory device. In additional or alternative embodiments, one or more of the programs, data sets, models, and functions described herein are stored in different memory devices accessible via the data network 906.

The cloud computer system 900 also includes a network interface device 914 that enables communications to and from cloud computer system 900. In certain embodiments, the network interface device 914 includes any device or group of devices suitable for establishing a wired or wireless data connection to the data networks 906. Non-limiting examples of the network interface device 914 include an Ethernet network adapter, a modem, and/or the like. The next event prediction and dynamic clustering service is able to communicate with the user devices 904A, 904B, and 904C via the data network 906 using the network interface device 914.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included within the scope of claimed embodiments.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A non-transitory computer-readable storage medium comprising computer-executable instructions that when executed by a processor cause the processor to:
   receive, from a transducer computing device located within a predefined proximity to an equipment in an operating environment, a vibration sample from the operating environment;
   incrementing a retrain counter in response to receiving the vibration sample;
   in response to determining that the incremented retrain counter does not meet or exceed a retrain threshold, predict, using a model, (1) an anomalous or non-anomalous designation for the vibration sample and (2) a cluster assignment, to a particular cluster of a set of clusters, for the vibration sample when the model predicts the non-anomalous designation for the vibration sample;
   receive, from the transducer computing device, a subsequent vibration sample from the operating environment;
   further increment the retrain counter in response to receiving the subsequent vibration sample; and
   in response to determining that the further incremented retrain counter exceeds a retrain threshold:
      receive, from the transducer computing device, a subsequent set of vibration samples from the operating environment; and
      retrain, using the subsequent vibration sample and the subsequent set of vibration samples, the model.

2. The non-transitory computer-readable storage medium of claim 1, wherein the equipment comprises an autonomous machine and wherein the non-transitory computer-readable storage medium further comprises computer-executable instructions that when executed by a processor cause the processor to transmit, responsive to determining the cluster assignment for the vibration sample and based on the cluster assignment, instructions to the autonomous machine to perform one or more operations or to stop performing one or more operations.

3. The non-transitory computer-readable storage medium of claim 1, wherein the transducer computing device comprises a transducer that detects physical vibrations in the operating environment and converts the detected physical vibrations to electrical signals and wherein the transducer computing device generates the vibration sample and the subsequent set of vibration samples based on the electrical signals generated by the transducer.

4. The non-transitory computer-readable storage medium of claim 1, further comprising computer-executable instructions that when executed by the processor cause the processor to:
   increment, when the model predicts an anomalous designation for the vibration sample, an alarm counter; and
   responsive to determining that the alarm counter meets or exceeds an alarm threshold, reporting an alarm status for the equipment to a computing system.

5. The non-transitory computer-readable storage medium of claim 1, wherein the model comprises an anomaly detection model and a cluster assignment model, wherein the anomaly detection model predicts the anomalous or non-anomalous designation for the vibration sample, and wherein the cluster assignment model determines the cluster assignment.

6. The non-transitory computer-readable storage medium of claim 5, wherein the anomaly detection model comprises a one class support vector machine ("OCSVM") and wherein the cluster assignment model comprises a multiple class logistic regression ("MCLR") model.

7. A computer-implemented method, comprising, using a sampling computing device:
   receiving, from a transducer computing device located within a predefined proximity to an equipment in an operating environment, a set of initial vibration samples from the operating environment;
   training an anomaly detection model using the set of initial vibration samples, wherein the anomaly detection model is trained to identify an input vibration sample as either anomalous or non-anomalous;
   receiving, from the transducer computing device located within a predefined proximity to an equipment in an operating environment, a vibration sample subsequent to receiving the set of initial vibration samples;
   in response to receiving the vibration sample from the transducer computing device, incrementing a retrain counter;
   if the retrain counter meets or exceeds a retrain threshold:
      receiving, from the transducer computing device, a subsequent set of initial vibration samples from the operating environment; and
      re-training the anomaly detection model using the vibration sample and the subsequent set of initial vibration samples, wherein the anomaly detection model is re-trained to identify the input vibration sample as either anomalous or non-anomalous.

8. The computer-implemented method of claim 7, wherein the equipment comprises an autonomous machine and wherein reporting the alarm for the operating site environment comprises transmitting instructions to the autonomous machine to perform one or more operations or to stop performing one or more operations.

9. The computer-implemented method of claim 7, wherein the transducer computing device comprises a transducer that detects physical vibrations in the operating environment and converts the detected physical vibrations to electrical signals and wherein the transducer computing device generates the set of initial vibration samples and the vibration samples based on the electrical signals generated by the transducer.

10. The computer-implemented method of claim 9, further comprising, using the sampling computing device:
  determining, using the anomaly detection model, that the vibration sample is anomalous;
  in response to determining that the vibration sample is anomalous, incrementing an alarm counter;
    if the incremented alarm counter meets or exceeds an alarm threshold, reporting an alarm for the operating site environment.

11. The computer-implemented method of claim 7, wherein the anomaly detection model comprises a one class support vector machine ("OCSVM").

12. The computer-implemented method of claim 7, further comprising, using the sampling computing device:
  training a cluster assignment model using the initial set of vibration samples, wherein the cluster assignment model is trained to classify the input vibration sample by assigning the input vibration sample to a cluster of a set of clusters.

13. The computer-implemented method of claim 12, wherein the cluster assignment model comprises a multiple class logistic regression ("MCLR") model.

14. The computer-implemented method of claim 12, wherein training the cluster assignment model comprises:
  performing a principal component analysis of the set of initial vibration samples to determine dimension data describing each of the set of initial vibration samples; and
  using a clustering algorithm to determine, based on the dimension data, to determine the set of clusters and to assign each of the set of initial vibration samples to a respective cluster of the set of clusters.

15. The computer-implemented method of claim 14, wherein training the cluster assignment model further comprises:
  reducing the dimension data from a first number of dimensions to a second number of dimensions, wherein the second number is less than the first number, wherein the clustering algorithm is used to determine the set of clusters and to assign each of the set of initial vibration samples to the respective cluster based on the reduced dimension data that comprises the second number of dimensions.

16. A system, comprising:
  one or more processors; and
  a non-transitory computer-readable storage medium comprising computer-executable instructions that, when executed by the processor, cause the system to:
    receive, from a transducer computing device located within a predefined proximity to an equipment in an operating environment, a set of initial vibration samples from the operating environment;
    train an anomaly detection model using the set of initial vibration samples, wherein the anomaly detection model is trained to identify an input vibration sample as either anomalous or non-anomalous;
    receive, from the transducer computing device located within a predefined proximity to an equipment in an operating environment, a vibration sample subsequent to receiving the set of initial vibration samples;
    in response to receiving the vibration sample from the transducer computing device, increment a retrain counter;
    if the retrain counter meets or exceeds a retrain threshold:
      receive, from the transducer computing device, a subsequent set of initial vibration samples from the operating environment; and
      re-train the anomaly detection model using the vibration sample and the subsequent set of initial vibration samples, wherein the anomaly detection model is re-trained to identify the input vibration sample as either anomalous or non-anomalous.

17. The system of claim 16, wherein the equipment comprises an autonomous machine and wherein reporting the alarm for the operating site environment comprises transmitting instructions to the autonomous machine to perform one or more operations or to stop performing one or more operations.

18. The system of claim 16, wherein the transducer computing device comprises a transducer that detects physical vibrations in the operating environment and converts the detected physical vibrations to electrical signals and wherein the transducer computing device generates the set of initial vibration samples and the vibration samples based on the electrical signals generated by the transducer.

19. The system of claim 18, wherein the non-transitory computer-readable storage medium further comprises computer-executable instructions that, when executed by the processor, cause the system to:
  determine, using the anomaly detection model, that the vibration sample is anomalous;
  in response to determining that the vibration sample is anomalous, increment an alarm counter; and
  if the incremented alarm counter meets or exceeds an alarm threshold, report an alarm for the operating site environment.

20. The system of claim 16, wherein the non-transitory computer-readable storage medium further comprises computer-executable instructions that, when executed by the processor, cause the system to train a cluster assignment model using the initial set of vibration samples, wherein the cluster assignment model is trained to classify the input vibration sample by assigning the input vibration sample to a cluster of a set of clusters.

* * * * *